April 14, 1925.
L. E. OSBORNE ET AL
1,533,135
COUPLER FOR LOCOMOTIVES AND TENDERS
Filed March 28, 1924
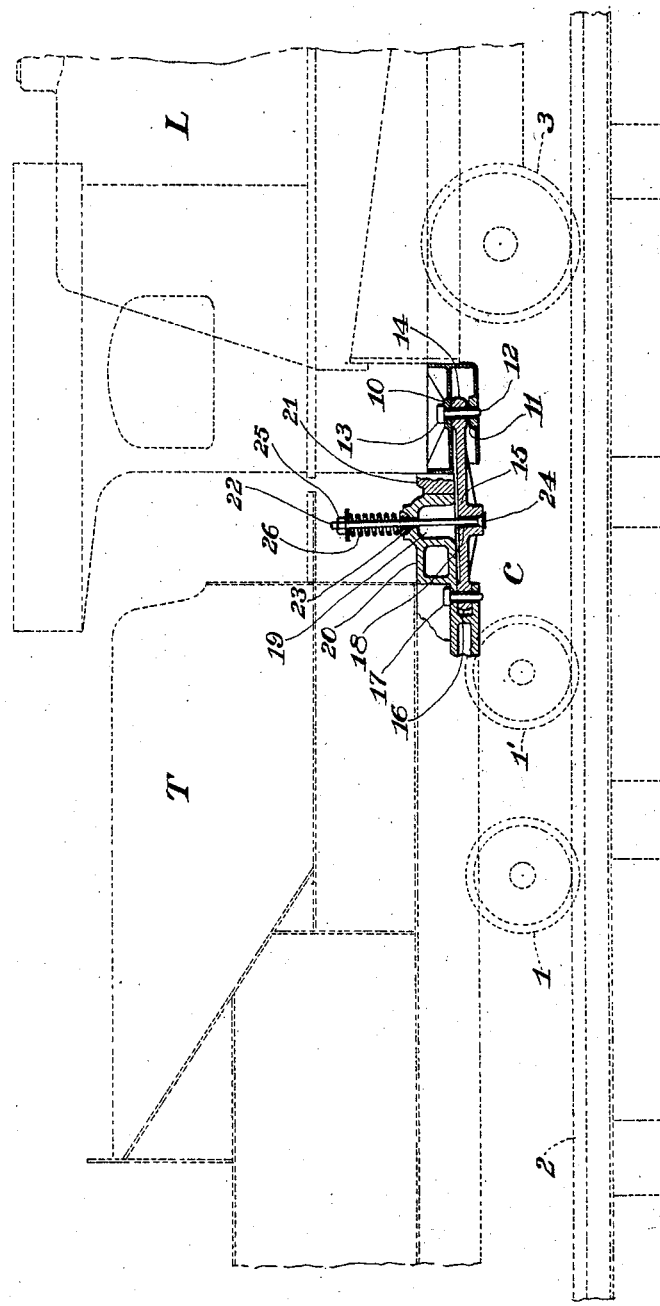
WITNESSES
INVENTORS

Patented Apr. 14, 1925.

1,533,135

UNITED STATES PATENT OFFICE.

LONNIE E. OSBORNE AND NATHAN M. LOWER, OF BELLEVUE, PENNSYLVANIA, ASSIGNORS TO FRANKLIN RAILWAY SUPPLY COMPANY, OF NEW YORK, N. Y., A CORPORATION OF DELAWARE.

COUPLER FOR LOCOMOTIVES AND TENDERS.

Application filed March 28, 1924. Serial No. 702,529.

*To all whom it may concern:*

Be it known that we, LONNIE E. OSBORNE and NATHAN M. LOWER, citizens of the United States, and residents of Bellevue, in the county of Allegheny and State of Pennsylvania, have invented a new and useful Improvement in Couplers for Locomotives and Tenders, of which the following is a specification.

This invention relates to couplings, and particularly to a coupler adapted for connecting a locomotive and tender.

In locomotives, as usually constructed at the present time, it is customary to position behind the driving wheels of the locomotive a pair of idle wheels known as a trailer. These trailer wheels support the rear end of the locomotive and carry a very large proportion of the weight thereof, in some cases as much as twenty-five per cent of the entire weight of the locomotive resting upon the trailer. In fact, in ordinary locomotive construction so much of the weight is thrown upon the trailer that the breaking of rails is frequently ascribed to this excess weight on these wheels. On the other hand, the tender, while reasonably heavy, at no point throws an excess weight or an overload upon the track. For this reason, it becomes highly desirable to transfer a portion of the weight of the locomotive ordinarily resting upon the trailer wheels to the wheels of the tender, thereby more evenly distributing the weight of the locomotive over a greater extent of the rails and eliminating the throwing of the excess weight or overload upon any limited area.

It is an object of this invention to provide means for connecting the locomotive and tender which will function to transfer a portion of the weight of the locomotive upon the tender, thereby relieving the supporting rails of the excessive load normally concentrated over the trailer wheels, and which will at the same time effectively join the locomotive and tender for traction purposes.

It is also an object of the invention to provide means for resiliently and flexibly connecting the locomotive and tender so as to permit relative free movement due to changes in the positions of the parts occurring during normal operation, and at the same time constantly transfer a portion of the weight of the rear portion of the locomotive upon a fixed part of the tender, preferably upon the buffer block used in connection with the tender.

It is a further object to provide means of the character referred to which is simple in construction, comprises comparatively few parts, may be economically manufactured, and which will not easily get out of order during continued use.

These and other objects of the invention will more fully appear when taken in conjunction with the following description and the appended claims.

The single figure of the drawings is a fragmentary diagrammatic view of a locomotive and tender with the coupling means forming the subject of this invention shown in section, the remaining portions being in elevation.

In the drawings, the locomotive as a whole is indicated by the reference character L, the tender used in connection therewith by the reference character T, and the improved coupler for connecting the locomotive and tender by the reference character C. As illustrated, the tender is equipped with an ordinary supporting truck the wheels of which are shown at 1, 1' cooperating with the rails 2 of the track. The rear portion only of the locomotive is shown, which portion is supported by means of the customary trailer wheels 3, ordinarily running idle and serving merely to carry a portion of the weight of the locomotive, as previously pointed out.

The rear portion of the locomotive frame is provided with the apertured bosses 10, 11, which are conveniently spaced apart and arranged in substantially vertical alignment. A coupling pin 12 is adapted to cooperate with the apertures of the bosses, the pin 12 extending completely therethrough, being supported by means of the head 13 which rests upon the upper surface of the boss 10. The distance between the bosses 10, 11 is substantially the same as the thickness of the terminal boss 14 at one end of a draw bar 15, the boss 14 having an aperture through which the pin 12 also projects when the parts are disposed in operative position, as illustrated in the drawing.

The opposite extremity of the draw bar is likewise provided with a boss 16 which corresponds in construction to the boss 14, and which is adapted to be pivotally connected with a suitable portion of the tender frame by means of a coupling pin 17 which passes through suitably formed apertures therein, and is supported in an analogous manner to that of the pin 12.

The draw bar 15 is provided with an apertured boss 18 disposed intermediate its ends, said boss lying directly below an opening 19 formed in the buffer block 20 connected to the tender. The buffer block cooperates with a corresponding buffer block 21 fixed to the locomotive, and functions in a well known manner. A bolt or bar 22 extends through an aperture 23 in the buffer block 20, and through the apertured boss 18, being provided with a head 24 which contacts the lower side of the draw bar, and is equipped with a nut 25 at its upper extremity. A coiled compression spring 26 encircles the bolt and is disposed between the upper surface of the buffer block 20 and the nut 25, suitable washers being employed at the opposite ends of the spring.

When the parts are disposed in operative position, as illustrated in the drawings, the compression of the spring 26 constantly causes an upward thrust upon the bolt 22, producing a consequent lifting action upon the draw bar 15 which fulcrums around its pivotal connection afforded by the coupling pin 17. The tendency of the draw bar 15 to rise due to the compression of the spring causes an upward thrust at the extremity of the bar attached to the locomotive, thereby carrying and causing a portion of the weight of the locomotive to be transferred, due to its connection with the tender, upon the truck thereof. Transfer of a portion of the weight of the locomotive in the manner explained, reduces that normally concentrated upon the trailer wheels 3, transferring the same upon the supporting wheels 1, 1' of the tender, thus more effectively distributing the entire weight over an extended area of the tracks.

Due to the particular combination and association of the several parts, a portion of the weight is constantly transferred to the tender, regardless of the vertical movements of the parts, caused by inequalities in the rails or of the road bed, and on account of the upward pull exerted by the spring 26 which maintains the parts in such relative positions as to continuously function in the desired manner. The association of the parts also permits relative movements which normally occur during the operation, without interfering with the continual transference of the weight from the rear part of the locomotive to the tender, through the coupling mechanism described.

It is thus seen that the improved means for coupling the locomotive to the tender produces a simple, compact, and durable mechanism which will effectively transfer a portion of the weight of the rear portion of the locomotive upon the tender, without interfering with the normal traction necessary to be maintained therebetween.

Although we have illustrated and described the preferred embodiments of the invention, as required by the patent statutes, it is obvious that many changes may be made in the details of construction or the arrangement of the several parts without departing from the spirit of the invention, and it is therefore not intended to limit the scope of the invention beyond that particularly pointed out and defined in the appended claims.

We claim:

1. The combination of a locomotive and its tender, a draw bar connected at its opposite ends to said locomotive and tender, and means on said tender exerting an upward pull on the end of the draw bar connected to the locomotive whereby to lift the last named end for transferring a portion of the weight of the locomotive upon the truck of the tender.

2. The combination of a locomotive and its tender, a draw bar pivotally connected at its opposite ends to the locomotive and tender, and resilient means mounted on the tender engaging an intermediate portion of the draw bar for exerting an upward thrust at its connection with the locomotive whereby to transfer a portion of the weight of the locomotive to the truck of the tender.

3. The combination of a locomotive and its tender, a draw bar pivotally connected at its opposite ends to the locomotive and tender, said draw bar being provided with an aperture intermediate its ends, a bolt the head of which contacts the lower surface of the bar passing through the said aperture, a spring engaging a fixed part of the tender and said bolt for urging said bolt upwardly to lift the end of the draw bar connected to the locomotive, whereby to permit relative movement between the parts while transferring a portion of the weight of the locomotive upon the tender.

4. The combination of a locomotive and its tender, a draw bar pivotally connected at its opposite ends to the locomotive and tender, said draw bar being disposed below the buffer block of the tender and provided with an aperture intermediate its ends, a bolt passing through the said aperture, and an opening formed in the buffer block, said bolt having a head at its lower extremity contacting the draw bar and a nut at its upper extremity, a coil spring encircling the bolt and interposed between the buffer block and said nut, whereby to permit relative movement between the parts while transferring a portion of the weight of the locomotive upon the tender.

5. The combination with a locomotive and its tender, a coupler connected to said locomotive and tender, and means for exerting a pull on the said coupler whereby to transfer a portion of the weight of the locomotive to the tender.

6. The combination with a locomotive and its tender, draft means connecting the locomotive and tender, and means operatively associated with the said draft means whereby to transfer a portion of the weight of the locomotive through the last named means to the tender.

7. The combination with a locomotive and its tender, a bar operatively associated with the locomotive and tender whereby to connect the said locomotive and tender for draft purposes, and means for urging the said bar in a direction to transfer a portion of the weight of the locomotive to the said tender.

8. The combination with a locomotive and its tender, a draft bar operatively connecting the locomotive and tender, and tension means for constantly exerting a lifting effect upon the portion of the bar connected to the locomotive, whereby to transfer a portion of the weight of the locomotive to the tender.

In testimony whereof, we hereunto sign our names.

LONNIE E. OSBORNE.
NATHAN M. LOWER.

Witnesses:
CHRISTIAN L. METZGER,
JAMES W. McCURDY.